UNITED STATES PATENT OFFICE.

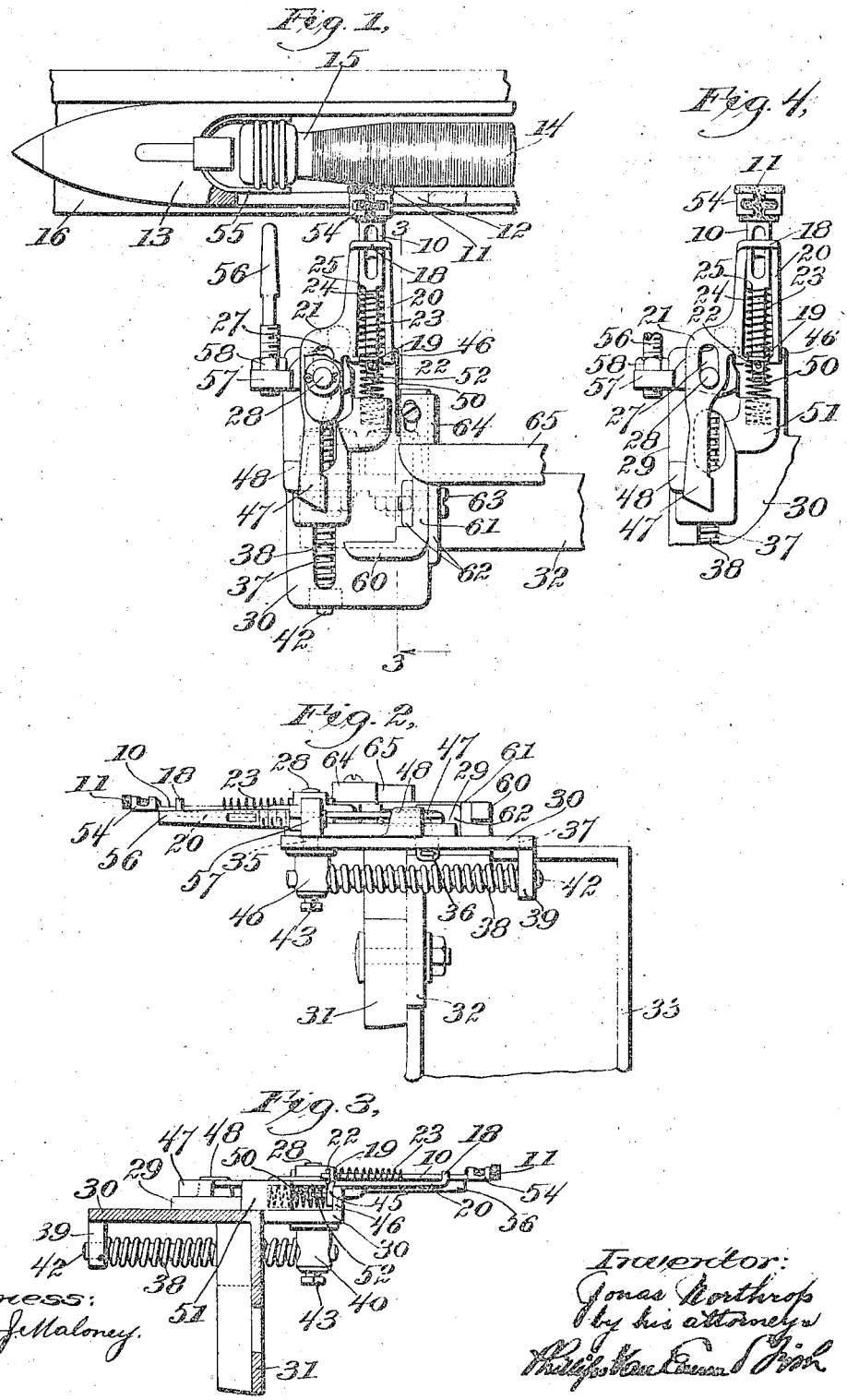

JONAS NORTHROP, OF HOPEDALE, MASSACHUSETTS, ASSIGNOR TO HOPEDALE MANUFACTURING COMPANY, OF MILFORD, MASSACHUSETTS, A CORPORATION OF MASSACHUSETTS.

FILLING-FEELER MECHANISM.

1,249,282.   Specification of Letters Patent.   Patented Dec. 4, 1917.

Application filed May 24, 1916. Serial No. 99,679.

*To all whom it may concern:*

Be it known that I, JONAS NORTHROP, a citizen of the United States, residing at Hopedale, in the county of Worcester and State of Massachusetts, have invented certain new and useful Improvements in Filling-Feeler Mechanisms; and I do hereby declare the following to be a full, clear, and exact description of the invention, such as will enable others skilled in the art to which it appertains to make and use the same.

The present invention relates to an improvement in filling feeler mechanisms for looms.

The object of the invention is to improve the construction of filling feeler mechanisms so that the operation of determining critical exhaustion of filling may be more uniformly and accurately performed. To the accomplishment of this object the invention resides in the improved filling feeler mechanism hereinafter described and particularly pointed out in the claims.

In the accompanying drawings illustrating the preferred form of the invention, Figure 1 is a plan of the filling feeler mechanism showing the relation of its parts when in normal position to the filling carrier; Fig. 2 is a side elevation looking from the left of the filling feeler mechanism shown in Fig. 1, a portion of the breast beam of the loom being also shown; Fig. 3 is a sectional elevation taken on the line 3—3 of Fig. 1; and Fig. 4 is a plan, with parts broken away and other parts removed, illustrating particularly the filling feeler.

The improved filling feeler mechanism comprises a filling feeling member or filling feeler which consists of a filling engaging member 10 and a feeler lever 21 upon which the filling engaging member is slidingly and yieldingly mounted. The filling engaging member is provided on its rearmost or filling engaging end with a felt piece 11 adapted to project through an opening 12 cut in the front wall of the shuttle 13 and contact with the filling 14 on the filling carrier 15 as the lay 16 beats up on its filling feeling beat. This beat-up of the lay occurs while the shuttle is boxed at the end of the lay opposite the filling feeler mechanism. The filling engaging member 10 is mounted for sliding movements toward and from the filling carrier in guideway lugs 18 and 19 extending upwardly from an offset arm 20 of the feeler lever 21. The filling engaging member 10 and the feeler lever 21 together constitute the filling feeling member or filling feeler. The filling engaging member is yieldingly pressed toward the filling carrier by a lightly tensioned compression spring 23 which encircles the shank 24 forming the forward end of the filling engaging member. The spring 23 is interposed between the rear side of the guideway lug 19 and a shoulder 25 formed at the junction of the head of the filling engaging member and the shank 24. The limit of movement of the filling engaging member toward the filling carrier is determined by the engagement of a stop pin 22, passed through the forward end of the shank 24 of the filling engaging member, with the forward side of the guideway lug 19. The feeler lever 21 is provided with an elongated guide slot or aperture 27 which loosely engages a vertically arranged guide pin 28 fixed in the rear end of a feeler slide 29 mounted for reciprocatory movements toward and from the lay on a slide support 30, of which a depending web 31 is secured by a bolt and slot connection to a bracket 32 fastened to the breast beam 33 of the loom.

The feeler side 29 is guided in its reciprocatory movements toward and from the lay by the part 35 of the guide pin 28 and by a lug 36 depending from the forward end of the feeler slide. These parts are loosely engaged by a slot 37 in the slide support 30, the slot 37 being arranged at right angles to the lay. The feeler slide 29 is arranged to be moved forwardly on the filling feeling beat of the lay, and is returned toward the lay as the lay retreats by means of a compression spring 38, of comparatively heavy tension, interposed between a lug 39 depending from the forward end of the slide support 30 and the head 40 which forms the lower extension of the guide pin 28. The spring 38 surrounds and is supported in operative position by a guide rod 42, of which the forward end is loosely received in a hole in the lug 39 and of which the rear end is adjustably secured in the guide pin head 40 by a set screw 43. The compression spring 38 normally holds the feeler slide 29 and the parts of the filling feeler mechanism mounted thereon in the position shown in Fig. 1.

While the parts of the filling feeler mechanism are in this position the part 35 of the guide pin 28 engages the rear end of the slot 37, a shoulder 45 formed on the forward end of the arm 20 of the feeler lever 21 presses against a stop lug 46 rising from the rear end of the slide support 30, and the forward end of an actuator arm 47 of the feeler lever 21 engages a stop lug 48 rising from the slide 29.

By reason of the elongated slot 27 in the feeler lever 21 the stress of the compression spring 38 is not communicated positively to the feeler lever while the lever is in the position shown in Fig. 1. The feeler lever is held in its normal position by means of a compression spring 50, one end of which is received in a recess in a boss 51 projecting laterally from the feeler slide 29 and the other end of which seats against the shoulder 45 of the arm 20 of the feeler lever and embraces a projection 52 extending forwardly therefrom. The spring 50 is so arranged that its stress holds the feeler lever shoulder 45 against the stop lug 46 and the forward end of the guide slot 27 against the guide pin 28.

As the lay moves forward on its filling feeling beat, and so long as the filling remains substantially in the condition shown in Fig. 1, the filling first comes in contact with the rear end of the felt piece 11 and pushes the filling engaging member 10 forwardly until the forward end of the clamp 54, formed on the rear end of the filling engaging member 10 and by which the felt piece 11 is held in place, strikes the guideway lug 18. As the lay continues its forward movement, the pressure of the clamp 54 upon the rear end of the feeler lever pushes the lever forward against the action of the spring 50, thereby disengaging the forward end of the guide slot 27 from the guide pin 28. Then, as the lay continues to move forward, the shuttle spring 55 strikes the rear end of a feeler controller 56 threaded at its forward end into a boss 57 extending laterally from the feeler slide 29. By turning the controller 56 in the threaded hole in the boss 57, the operative position of the controller may be adjusted relatively to the filling engaging member 10. The check-nut 58 secures the controller in adjusted position. The pressure of the forwardly advancing lay upon the controller 56 moves the feeler slide 29 and the parts carried by it forwardly. The composition of felt is such that so long as the filling is in engagement with the felt, the friction between them prevents the filling engaging member from being moved longitudinally of the filling carrier, that is, transversely of the spiral windings of filling on the carrier. When the filling carrier advanced, its engagement with the filling engaging member first pushed the latter forward against the action of the spring 23, and then pushed the feeler lever 21 forward against the action of the spring 50 and disengaged the forward end of the guide slot 27 from the guide pin 28; the action of the spring 50 in returning the feeler lever 21 to its normal position, therefore, so long as the forward end of the guide slot 27 is not in contact with the guide pin 28, will be in a straight line toward the filling carrier. But when the spring 50 has been permitted to push the feeler lever rearwardly far enough to bring the forward end of the guide slot against the guide pin, then the further action of the spring 50 will tend to swing the feeler lever about the guide pin 28 as a pivot. When the filling has been so far depleted that the angular relation between the butt-end windings of the filling and the felt piece 11 (as shown in Fig. 1) has been destroyed, the filling engaging member 10 is not carried forward far enough by the filling on the filling feeling beat to bring the clamp 54 into contact with the rear end of the feeler lever 21 before the shuttle spring 55 strikes the controller 56; consequently the forward end of the guide slot 27 is not disengaged from the guide pin 28, and the feeler slide and feeler are carried forward without relative movement.

The pivotal movement of the feeler lever 21 about the guide pin 28 is prevented while the parts of the filling feeler mechanism are in normal position by the overpowering stress of the spring 38, and is also prevented on the filling feeling beat of the lay while filling remains on that part of the filling carrier opposite the filling engaging member. But when the filling on that part of the filling carrier opposite the filling engaging member has become completely exhausted so as to expose the surface of the filling carrier, and the feeler slide and the parts supported by it have been moved forwardly by the engagement of the shuttle spring 55 with the controller 56, the spring 50 acts to swing the feeler lever about the guide pin 28 and cause the felt piece 11 to travel along the unwound surface of the filling carrier toward the butt thereof. As the felt piece comes into engagement with the end windings of the filling, the pivotal movement of the feeler lever is stopped; but as the filling continues to unwind, the spring 50 forces the felt filling engaging piece along the filling carrier surface toward the butt of the filling carrier. While the filling engaging end of the filling feeler approaches the carrier butt, the forward end of the actuator arm 47 of the feeler lever approaches its operative position behind a finger 60 of a slide 61 mounted for sliding movements toward and from the lay between two guide ears 62 rising from the slide support; a screw 63 passes through a slot in the slide and holds it in place. Upon the rear end of the slide 61 is adjustably secured a block 64 normally in engagement with an arm 65 operatively connected with devices for controlling the operation of the loom. If the filling feeler mechanism is applied to a plain loom, the arm 65 is connected with loom stopping devices and an actuation of the arm 65 results in loom stoppage. If the filling feeler mechanism is applied to a weft replenishing loom, the arm 65 is connected with the filling supply controlling means and an actuation of the arm 65 results in the insertion of a fresh supply of filling in the shuttle. During regular weaving the arm 65 is held toward the lay in engagement with the actuator block 64.

When the filling has become so far exhausted as to permit the spring 50 to move the filling engaging end of the filling engaging member to a predetermined point from the butt end of the filling carrier, the filling has been critically exhausted. By this time the forward end of the actuator arm 47 of the feeler lever 21 will have swung far enough to the right to be in operative position behind the finger 60, and thereupon, as the lay continues its forward movement, the pressure of the actuator against the finger 60 moves it and the block 64 forwardly, thereby actuating the arm 65 and causing a change in the operation of the loom.

I will have been observed that by reason of the above-described construction and arrangement of filling feeler mechanism parts the filling feeler is moved forward relatively to the slide and in a straight line until the filling is unwound or exhausted to a predetermined extent; then as the filling continues to unwind, the filling feeler is moved forward by the slide and without movement relatively thereto; and finally, when the filling has been unwound or depleted to approximately critical exhaustion, the filling feeler is turned on its guide pin relatively to the slide to effect a change in the operation of the loom.

Having thus described the invention, what I desire to secure by Letters Patent is:—

1. A loom having, in combination, a lay, a shuttle, a filling carrier, and a filling feeler mechanism comprising a feeler slide movable toward and from the lay, a feeler lever mounted on the slide for reciprocatory and pivotal movements relatively thereto, and a filling engaging member slidingly mounted on the feeler lever.

2. A loom having, in combination, a lay, a shuttle, a filling carrier, and a filling feeler mechanism comprising a feeler slide movable toward and from the lay, and a filling feeler mounted on the slide constructed and arranged to have a reciprocatory and a pivotal movement relatively thereto.

3. A loom having, in combination, a lay, a shuttle, a filling carrier, and a filling feeler mechanism comprising a slide movable toward and from the lay, a feeler controller fixed on the slide, a filling feeler mounted on the slide constructed and arranged to have a reciprocatory movement relatively to the slide when the feeler first contacts with the filling and then to have no movement relatively to the slide as the filling continues to unwind, and means acting when the filling approximates critical exhaustion to impart a pivotal movement to the feeler.

4. A loom having, in combination, a lay, a shuttle, a filling carrier, and a filling feeler mechanism comprising a slide, a filling feeler controller secured thereto, a guide pin fixed thereon, and a feeler having an elongated aperture in engagement with the guide pin by virtue of which reciprocatory and pivotal movements may be imparted to the feeler.

5. A loom having, in combination, a lay, a shuttle, a filling carrier, and a filling feeler mechanism comprising a slide, a controller, and a filling feeler consisting of a feeler lever having an elongated aperture permitting reciprocatory and pivotal movements relatively to the slide, and a filling engaging member slidingly mounted on the feeler lever.

6. A filling feeler mechanism for looms, comprising a slide movable toward and from the lay, a filling feeler mounted on the slide for movement relatively thereto, means for moving the filling feeler relatively to the slide, and a feeler controller fixed on the slide and arranged to be struck by the shuttle, the whole being constructed and arranged so that the filling feeler moves relatively to the slide until the filling is unwound to a predetermined extent, then remains stationary relatively to the slide as the filling continues to unwind, and then again moves relatively to the slide when the filling is unwound to approximately critical exhaustion.

7. A loom having, in combination, a lay, a shuttle, a filling carrier, and a filling feeler mechanism comprising a slide movable toward and from the lay, a guide pin on the slide, a filling feeler mounted on the slide provided with an elongated aperture in alinement with the path of movement of the slide for engaging the guide pin, and means for imparting reciprocatory and pivotal movements to the feeler relatively to the slide.

8. A loom having, in combination, a lay, a shuttle, a filling carrier, and a filling feeler mechanism comprising a slide, a feeler controller secured thereto, a guide pin fixed thereon, and a filling feeler comprising a feeler lever and a filling engaging member slidingly mounted on the feeler lever, said feeler lever having an elongated aperture in engagement with the guide pin whereby reciprocatory and pivotal movements may be imparted thereto.

9. A loom having, in combination, a lay, a shuttle, a filling carrier, and a filling feeler mechanism comprising a slide, a feeler controller secured thereto, a guide pin fixed on the slide, a filling feeler in engagement with the guide pin whereby it may have reciprocatory movements relatively to the slide on the filling feeling beat of the lay until the filling has been exhausted to a predetermined extent, and means for turning the filling feeler on the guide pin when the filling has been exhausted to a predetermined extent.

10. A loom having, in combination, a lay, a shuttle, a filling carrier, and a filling feeler mechanism comprising a slide, a feeler controller and a filling feeler mounted on the slide, said feeler being constructed and arranged to have a reciprocatory movement relatively to the slide by engagement with the filling until the filling is exhausted to a predetermined extent, and means for imparting a pivotal movement to the feeler when the filling has been exhausted to a predetermined extent.

11. A loom having, in combination, a lay, a shuttle, a filling carrier, and a filling feeler mechanism comprising a slide movable toward and from the lay, a feeler lever mounted on the slide having provision for reciprocatory and pivotal movements relatively to the slide, a feeler controller fixed on the slide and arranged to be struck by the shuttle, a filling engaging member slidingly mounted on the feeler lever and yieldingly pressed toward the lay, and means operating on predetermined exhaustion of filling to cause the filling engaging member to move along and in engagement with the denuded surface of the filling carrier.

JONAS NORTHROP.